(12) United States Patent
DiGiovanni et al.

(10) Patent No.: US 6,826,341 B2
(45) Date of Patent: Nov. 30, 2004

(54) SYSTEMS AND METHODS FOR REDUCING SPLICE LOSS IN OPTICAL FIBERS

(75) Inventors: David John DiGiovanni, Montclair, NJ (US); Peter Mikal Holmblad, Kokkedal (DK); Torben E. Veng, Roskilde (DK); Andrew D. Yablon, Livingston, NJ (US)

(73) Assignee: Fitel USA Corp., Norcross, GA (US)

( * ) Notice: Subject to any disclaimer, the term of this patent is extended or adjusted under 35 U.S.C. 154(b) by 40 days.

(21) Appl. No.: 10/287,307

(22) Filed: Nov. 4, 2002

(65) Prior Publication Data

US 2004/0086243 A1 May 6, 2004

(51) Int. Cl.[7] .............................................. G02B 6/02
(52) U.S. Cl. ........................................................ 385/123
(58) Field of Search ........................................ 385/123

(56) References Cited

U.S. PATENT DOCUMENTS

| | | | |
|---|---|---|---|
| 4,655,545 A | * 4/1987 | Yamanishi et al. | ......... 385/141 |
| 5,066,087 A | * 11/1991 | Yamauchi et al. | ............ 385/43 |
| 5,446,820 A | * 8/1995 | Ishikawa et al. | ............ 385/123 |
| 5,597,398 A | 1/1997 | Ishikawa et al. | |
| 5,740,297 A | 4/1998 | Onishi et al. | |
| 5,802,235 A | 9/1998 | Akasaka | |
| 6,125,225 A | * 9/2000 | Dianov et al. | ............... 385/124 |
| 6,343,175 B1 | 1/2002 | Sasaoka | |
| 6,542,683 B1 | * 4/2003 | Evans et al. | ................. 385/127 |
| 2003/0138229 A1 | * 7/2003 | Paek et al. | .................... 385/123 |

FOREIGN PATENT DOCUMENTS

JP     P2002-214467 A    7/2002

OTHER PUBLICATIONS

Tateda, M. et al., "Design of Viscosity–Matched Optical Fibers," IEEE Photonics Technology Letters, Sep. 1992, pp. 1023–1025, vol. 4, No. 9.

Sakaguchi, S. et al., "Viscosity of Silica Core Optical Fiber", Journal of Non–Crystalline Solids, 1999, pp. 232–237, vol. 244.

* cited by examiner

Primary Examiner—Mark Tremblay
(74) Attorney, Agent, or Firm—Daniel Kim, Esq.

(57) ABSTRACT

Optical fibers are described that exhibit reduced splice loss. Further described are techniques for fabricating optical fibers exhibiting reduced splice loss. One described fiber includes a plurality of regions, one region having a higher viscosity and the other region having a lower viscosity, such that when the fiber is drawn under tension, a strain is frozen into the higher viscosity region. A lower viscosity buffer layer is sandwiched between the higher viscosity region and the lower viscosity region. The buffer layer isolates the lower viscosity region from changes in refractive index in the higher viscosity region arising from a change in the strain frozen into the higher viscosity region.

20 Claims, 8 Drawing Sheets

SYSTEMS AND METHODS FOR REDUCING SPLICE LOSS IN OPTICAL FIBERS

BACKGROUND OF THE INVENTION

1. Field of the Invention

The present invention relates generally to the field of fiber optics, and particularly to advantageous aspects of systems and methods for reducing splice loss in optical fibers.

2. Description of Prior Art

When optical fibers are spliced together, a certain amount of splice loss typically results. Because of the increasing demands being placed on optical fiber transmission systems, the problem of splice loss has become increasingly significant. Techniques have been developed to reduce splice loss. However, such techniques typically focus on refinements to the splicing operation, or on post-splice treatments of spliced fibers.

The prior art includes descriptions of optical fibers with specific viscosity characteristics. See, for example, M. Tateda et al., "Design of Viscosity-Matched Optical Fibers," IEEE Photonics Technology Letters, Vol. 4, No. 9, pp. 1023–25 (1992). In one described design, residual elastic stress is reduced in order to reduce Rayleigh scattering losses. S. Sakaguchi et al., "Viscosity of Silica Core Optical Fiber," Journal of Non-Crystalline Solids, Vol. 244, pp. 232–73 (1999).

SUMMARY OF INVENTION

Aspects of the invention provide optical fibers exhibiting reduced splice loss and methods for making same. An optical fiber according to an aspect of the invention comprises a plurality of regions, one region having a higher viscosity and the other region having a lower viscosity, such that when the fiber is drawn under tension, a strain is frozen into the higher viscosity region. A lower viscosity buffer layer is sandwiched between the higher viscosity region and the lower viscosity region. The buffer layer isolates the lower viscosity region from changes in refractive index in the higher viscosity region arising from a change in the strain frozen into the higher viscosity region.

Additional features and advantages of the present invention will become apparent by reference to the following detailed description and accompanying drawings.

BRIEF DESCRIPTION OF DRAWINGS

FIGS. 11A–14A show a series of cross section views, and FIGS. 11B–14B show a series of end views, of a preform being fabricated using a modified chemical vapor deposition technique.

DETAILED DESCRIPTION

One factor contributing to splice loss is viscoelastic strain that is introduced into an optical fiber by the draw process, particularly where a fiber is drawn under an applied tension. Because of the rapid cooling of optical fiber during the manufacturing process, this viscoelastic strain is frozen into the drawn fiber. Because of the photoelastic effect, a frozen-in viscoelastic tensile strain typically results in a decrease in the refractive index of the strained region of optical fiber. During a subsequent splicing operation, the heat used to splice optical fibers causes a relaxation of the frozen-in viscoelastic strain, causing an increase in the refractive index of the strained fiber.

A typical optical fiber includes a plurality of regions, which may have different viscosities. One typical optical fiber design, for example, includes a lower viscosity core structure surrounded by a higher viscosity cladding. During the manufacturing process, the cladding, because of its higher viscosity, bears the brunt of the draw tension and undergoes significant viscoelastic strain, while the core structure remains relatively unaffected. Because of the photoelastic effect, the cladding experiences a decrease in its refractive index, while the refractive index of the core structure remains substantially the same. In a subsequent splicing operation, the heat of the fusion splicer causes the viscoelastic strain in the cladding to relax, causing the refractive index of the cladding to increase.

In typical optical fiber designs, a portion of the modefield energy travels in the cladding, so that the fiber's guiding properties are sensitive to refractive index changes in the cladding. Thus, the increase in the cladding's refractive index in the vicinity of the splice has an adverse effect on the modefield shape of the spliced fibers in the vicinity of the splice, resulting in splice loss.

According to an aspect of the present invention, the above-described splice loss is reduced by introducing a lower viscosity buffer layer between the core structure and the cladding. Because of its lower viscosity, the buffer layer is relatively unaffected by draw tension, the brunt of which continues to be borne by the higher viscosity cladding. The buffer layer thus serves to isolate the core structure from draw-induced or splice-induced refractive index changes occurring in the cladding. Thus, the presence of the buffer layer tends to reduce adverse changes in the fiber's effective area and dispersion characteristics leading to splice loss.

It should be noted that, in addition to reducing splice loss, the present invention also allows for better predictability in fiber properties, such as dispersion. It is well known that dispersion depends on draw conditions because of the change in index of the high-viscosity cladding layers. This dependence of dispersion on draw conditions is undesirable. A buffer layer may be used to reduce this effect, allowing greater reproducibility and predictability. However, as discussed further below, this application of the invention may require a thicker buffer layer than a buffer layer used to reduce splice loss.

The present invention may be better understood by comparing two exemplary fibers drawn under high tension, that is, on the order of 200 g, or greater. The two fibers are substantially identical, except that the second fiber is provided with a buffer layer sandwiched between the fiber's core structure and cladding. Refractive indices are modeled for the two fibers, both in their strained, as-drawn state, and in their relaxed, spliced state. A conventional finite-difference beam-propagation method (FD-BPM) is then used to predict the splice loss that would result if each fiber were spliced to itself.

Figure 1:
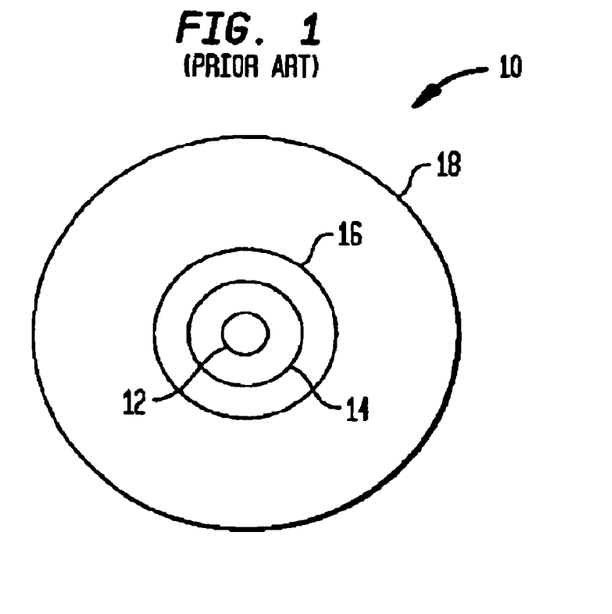
FIG. 1 shows a cross section of an exemplary dispersion compensating fiber according to the prior art.

FIG. 1 shows a cross section of an exemplary dispersion compensating fiber (DCF) 10, also known as an inverse dispersion fiber (IDF), or a reverse dispersion fiber (RDF). Such a fiber is typically constructed from pure silica ($SiO_2$) that has been doped to create a core 12 and a number of layers surrounding the core, including a trench layer 14, a ring layer 16, and a cladding 18. In this exemplary fiber 10, the cladding 18 ranges from an 8-micron radius to the fiber surface at 62.5 microns, and is assumed to be pure, undoped silica.

Figure 2:
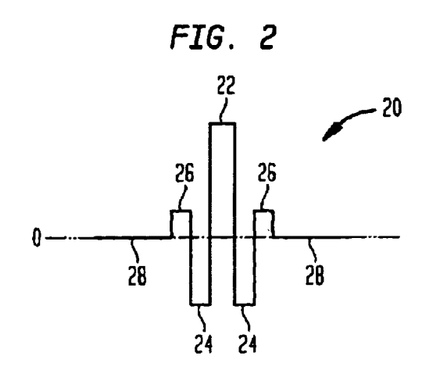
FIG. 2 shows a graph of a refractive index profile of a preform from which the fiber shown in FIG. 1 has been drawn.

FIG. 2 shows a refractive index profile 20 of a preform from which the DCF 10 shown in FIG. 1 has been drawn. Because the fiber has not yet been drawn, the FIG. 2 refractive index profile does not reflect any frozen-in viscoelastic strain. The refractive index profile includes a central spike 22, corresponding to the DCF core 12. On each side of the spike 22 is a deep trench 24, corresponding to the trench layer 14. A pair of shoulders 26 corresponds to the ring layer 16, and a pair of plateaus 28 corresponds to the cladding 18. For purposes of discussion, the refractive index of the unstrained cladding 28 has been normalized to zero.

Chemical dopants are used to achieve the refractive index profile shown in FIG. 2. For example, the central spike 22 may be created by doping the core 12 with germanium. The trenches 24 may be created by doping the trench layer 14 with fluorine. The shoulders 26 may be created by doping the ring layer 16 with germanium. Finally, in the present example, the cladding 18 is undoped. It should be noted that the present invention also may be used in conjunction with other types of optical fiber having different doping schemes, including a doped cladding.

For the purposes of the present discussion, the core 12, trench layer 14, and ring layer 16 are collectively referred to as a "core structure." Germanium and fluorine, when used as dopants, have the effect of lowering the viscosity of silica. Thus, the effect of the above-described doping scheme is that the core structure has a viscosity that is lower than that of the cladding.

Figure 3:
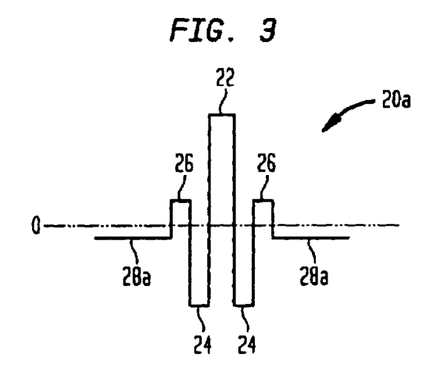
FIG. 3 shows a graph of a refractive index profile of the fiber shown in FIG. 1, as drawn.

FIG. 3 shows a refractive index profile 20a for an optical fiber drawn from a preform having the refractive index profile shown in FIG. 2. In this example, it is assumed that the optical fiber has been drawn under high tension, thus causing viscoelastic strain to be frozen into the drawn fiber. An example of a high draw tension is 200 grams, corresponding to approximately 160 MPa draw stress for a 125-micron diameter fiber. A high draw tension may be used, for example, to reduce optical loss or minimize dopant diffusion during the draw process. As described above, the brunt of the tension is borne by the higher viscosity cladding. Thus, because of the photoelastic effect, the viscoelastic strain that has been frozen into the cladding 18 causes the side plateaus 28a of the refractive index profile 20a shown in FIG. 3 to be approximately 0.001 lower than the side plateaus 28 shown in the FIG. 2 refractive index profile 20. The unstrained refractive index of a pure silica cladding is approximately 1.458 at 632 nm and 1.444 at 1550 nm.

Figure 4:
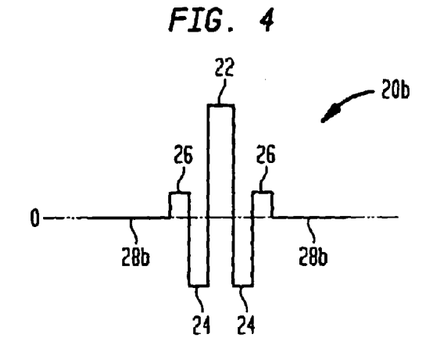
FIG. 4 shows a graph of a refractive index profile of a portion of the fiber shown in FIG. 1, after that portion has been heated in a fusion splicing operation.

FIG. 4 shows a refractive index profile 20b for a region of the optical fiber after it has been heated in a fusion splicing operation. As discussed above, the heat applied to the fiber during splicing results in a relaxation of frozen-in viscoelastic strain. As shown in FIG. 4, this relaxation causes the refractive index of the cladding 28b to revert to the refractive index 28 shown in FIG. 2. The higher cladding index causes the relaxed portion of the fiber to be a "weakly guiding" fiber, in the sense that the modefield is less tightly bound to the core. This weaker guidance makes the splice more sensitive to bends and core misalignments, and is a poor modefield match to other "strongly guiding" fibers, such as standard single-mode fiber (SMF).

Figure 5:
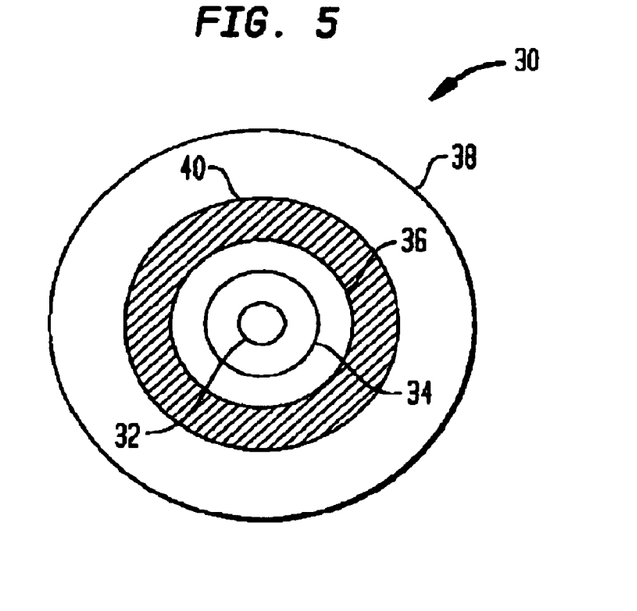
FIG. 5 shows a cross section of an exemplary dispersion compensating fiber according to an aspect of the invention.

FIG. 5 shows a cross section of an exemplary fiber 30 according to an aspect of the present invention. The fiber 30 is similar to the fiber shown in FIG. 1, and includes a core 32, a trench layer 34, a ring layer 36, and a cladding 38. In addition, the fiber 30 includes a buffer layer 40 that has been sandwiched between the ring layer 36 and the cladding 38. In this fiber 30, the lower-viscosity buffer layer 40 ranges from a radial position of 8 microns out to a radial position of 12 microns, and has a refractive index that is approximately 0.001 less than that of pure, unstrained silica. It should be noted that other refractive indices may be used for the buffer layer to achieve certain fiber performance characteristics, without departing from the spirit of the invention. The cladding 38 ranges from 12 microns out to the fiber surface at 62.5 microns, and is assumed to be pure silica.

Figure 6:
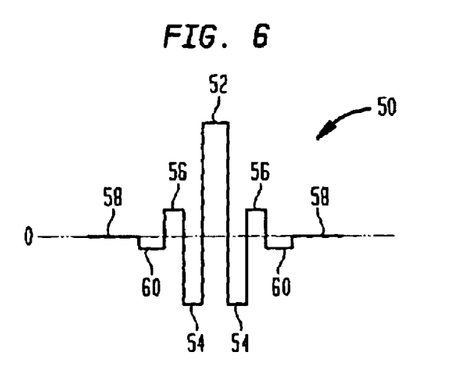
FIG. 6 shows a graph of a refractive index profile of a preform from which the fiber shown in FIG. 5 has been drawn.

FIG. 6 shows the refractive index profile 50 of a preform from which the fiber 30 shown in FIG. 5 has been drawn. The refractive index profile 50 includes a central spike 52, a pair of deep trenches 54, a pair of shoulders 56, and a pair of plateaus 58, corresponding, respectively, to the core 32, trench layer 34, ring layer 36, and cladding 38. In addition, the refractive index profile 50 includes a pair of depressed regions 60, corresponding to the buffer layer 40.

Figure 7:
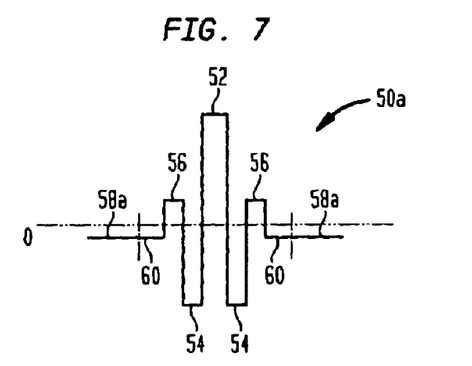
FIG. 7 shows a graph of a refractive index profile of the fiber shown in FIG. 5, as drawn.

FIG. 7 shows a refractive index profile 50a of an optical fiber drawn under high tension, such as 200 g, from a preform having the refractive index profile 50 shown in FIG. 6. As shown in FIG. 7, the drawing process has caused viscoelastic strain to become frozen into the cladding 38, thereby causing its refractive index 58a to decrease such that it matches the index of the buffer layer 60. It will be seen that the "as-drawn" refractive index profile 50a shown in FIG. 7 is substantially identical to the "as-drawn" refractive index profile 20a shown in FIG. 3. However, as discussed below, the addition of a buffer layer to a fiber will not necessarily result in a fiber having the same as-drawn refractive index as the unbuffered fiber.

Figure 8:
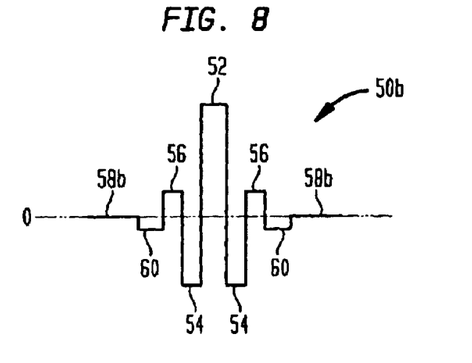
FIG. 8 shows a graph of a refractive index profile of a portion of the fiber shown in FIG. 5, after that portion has been heated in a fusion splicing operation.

FIG. 8 shows a refractive index profile 50b of a region of the optical fiber 30 after it has been heated in a splicing region, thereby causing the viscoelastic strain frozen into the cladding 38 to relax. As shown in FIG. 8, the relaxation of the viscoelastic strain causes the refractive index of the cladding 58b to revert to the preform level shown in FIG. 6.

Figure 9:
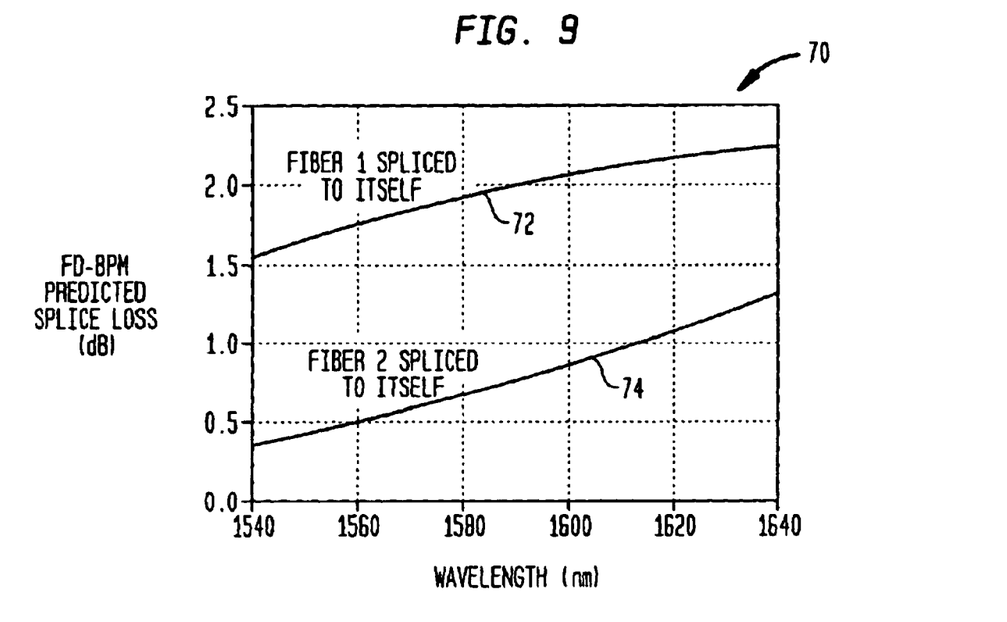
FIG. 9 shows a graph comparing predicted splice loss for each of the fibers shown in FIGS. 1 and 5, when each fiber is spliced to itself.

A conventional finite-difference beam-propagation method (FD-BPM) may be used to compute how an input mode propagates through a region of fiber with a specified refractive index profile. An FD-BPM may be applied to the refractive index profiles shown in FIGS. 3, 4, 7 and 8 to predict the amount of splice loss that would result when each of the fibers is spliced to itself. For the purposes of the FD-BPM analysis, it was assumed that the fusion splice relaxes the fiber within 500 microns of the fusion splice, and that the transition between the relaxed and unrelaxed fiber is abrupt. The results obtained from the FD-BPM method were then plotted onto a graph 70 shown in FIG. 9. The upper trace 72 shows the predicted splice loss for the unbuffered fiber 10 shown in FIG. 1, and the lower trace 74 shows the predicted splice loss for the buffered fiber 30 shown in FIG. 5. From FIG. 9, it will be seen that the inclusion of a buffer layer produces a significant decrease in splice loss over a wide range of wavelengths. If the low-viscosity buffer layer is extended out to a radius beyond 12 microns, the predicted fusion splice loss is further reduced. Thus, the extent of the low-viscosity buffer layer can be tailored to make the fusion splice loss arbitrarily small.

It is understood that in an actual fusion splice, other effects can occur, such as dopant diffusion or relaxation of residual elastic stress. These effects can modify the refractive index of the core, ring, and trench layers of the fiber. Moreover, the transition between the relaxed and unrelaxed portions of fiber may not be as abrupt or ideal as in this simulation.

It should further be noted that the addition of a buffer layer to an already existing fiber design may affect the dispersion, effective area, and other properties of the fiber, as a result of the effect that the buffer layer may have on the fiber's refractive index profile. Thus, if it is desired to add a low-viscosity buffer layer to an existing fiber design, it may be necessary to make adjustments to the design to obtain the desired optical properties.

Figure 10:
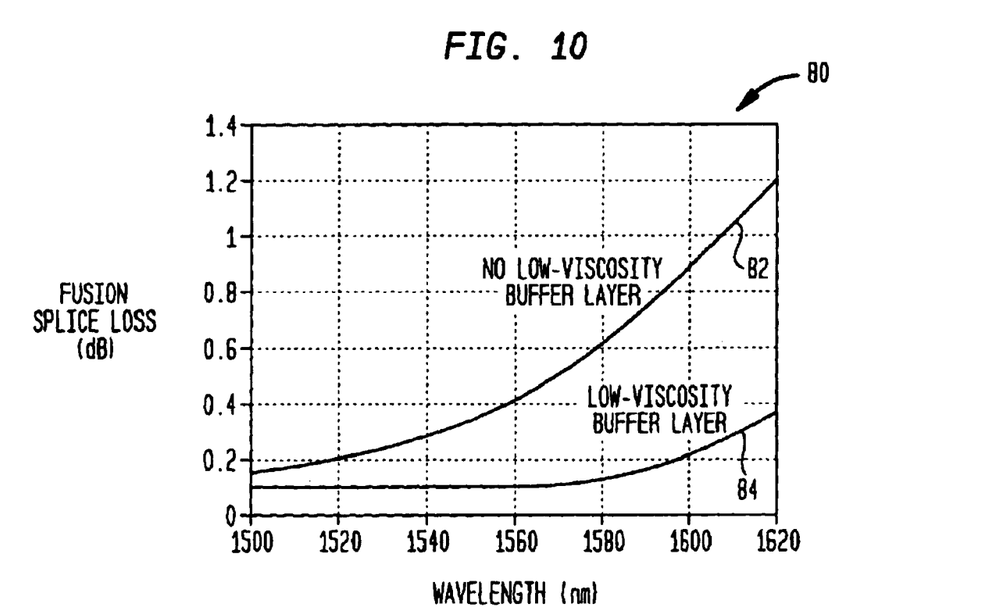
FIG. 10 shows a graph setting forth experimental data comparing splice loss of two fibers, one having a buffer layer according to an aspect of the invention, and the other not having a buffer layer.

The efficacy of the present invention has been confirmed experimentally. FIG. 10 shows a graph 80 that depicts fusion splice loss of two fibers with substantially identical designs. Both fibers exhibited nearly equal, highly negative dispersions, and were both drawn at high tension. The main difference between the fibers was that one of the fibers contained a low-viscosity buffer layer separating the core structure from the pure silica cladding and the other did not. The upper trace 82 shows the measured splice loss for the unbuffered fiber, and the lower trace 84 shows the measured splice loss for the buffered fiber. FIG. 10 demonstrates that the splice loss and the wavelength dependence of the splice loss were much lower in the fiber incorporating a low-viscosity buffer layer, especially at longer wavelengths.

Suitable dopants for creating a low-viscosity buffer layer include, for example, phosphorus pentoxide, boron oxide, fluorine, germania, or a combination of these dopants. Certain dopants, such as phosphorus or boron, are particularly attractive because relatively small amounts of these dopants can significantly reduce the glass viscosity. In one exemplary case, the viscosity of the silica in the buffer layer was sufficiently lowered by the addition of approximately 0.3 mole percent of phosphorus pentoxide ($P_2O_5$). This amount of phosphorus pentoxide increases the silica's refractive index by approximately 0.0005, or approximately 0.034%.

Approximately 0.3 mole percent of boron oxide ($B_2O_3$) may be used instead of phosphorus pentoxide, since boron oxide reduces the glass viscosity by about the same amount as phosphorus pentoxide. This amount of boron lowers the silica refractive index by approximately 0.0005, or approximately 0.034%. It should be noted that both the amount of phosphorus or boron used and the perturbation to the refractive index are relatively small. It should further be noted that a suitable buffer layer may be created using these or other dopants, singly or in combination, and at various concentrations, as required to produce an optical fiber with desired properties.

The thickness of the buffer layer is determined empirically, based on a number of different considerations. In one exemplary case, splice loss was reduced by using a buffer layer approximately 2 microns thick, surrounding a composite core structure having a diameter of approximately 18 microns. The composite core structure includes a central core having a diameter of approximately 6 microns. Further experiments have shown that increasing the thickness of the buffer layer further improves splice loss reduction. Splice reduction may be obtained using a buffer layer approximately 0.5 microns thick and possibly an even thinner buffer layer may produce a reduction in splice loss, depending upon the design of the optical fiber. The buffer layer is particularly effective at thicknesses of 5 microns, or greater, but such a thick buffer layer can make the MCVD deposition process described below time-consuming and expensive, because of the amount of low-viscosity material that must be deposited.

It has been determined experimentally that satisfactory splice reduction results when the thickness of the buffer layer is designed to be large enough to ensure that the amount of signal power guided in the high-viscosity cladding is less than 10 percent of the total guided signal power. Following this guideline, it has been found that the fiber's guiding properties are minimally affected by changes to the refractive index of the high-viscosity cladding.

As mentioned above, a low-viscosity buffer layer allows better predictability in fiber properties, such as dispersion. If it is desired to maximize predictability, it may be necessary to use a buffer layer arrangement in which significantly less than 10 percent of the total guided signal power is guided in the high-viscosity cladding. One guideline in determining the thickness of the buffer layer is to use a buffer layer that moves the high-viscosity region to a position that is an experimentally determined multiple of the core radius. For example, it may be determined that a multiple of 10 is suitable to minimize the effect of draw-induced viscoelastic strain on dispersion. In the exemplary fiber discussed above, the core has a diameter of approximately 6 microns, and therefore has a radius of approximately 3 microns. Thus, a buffer layer would be used having a thickness that would move the high-viscosity region to a position where it would have an inner radius of approximately 30 microns.

Various techniques may be used to fabricate an optical fiber having a buffer layer. One suitable technique is a modified chemical vapor deposition technique (MCVD), illustrated in FIGS. 11–14, and described below. Other suitable techniques include outside vapor deposition (OVD), vapor axial deposition (VAD), or the like.

Figure 11A:
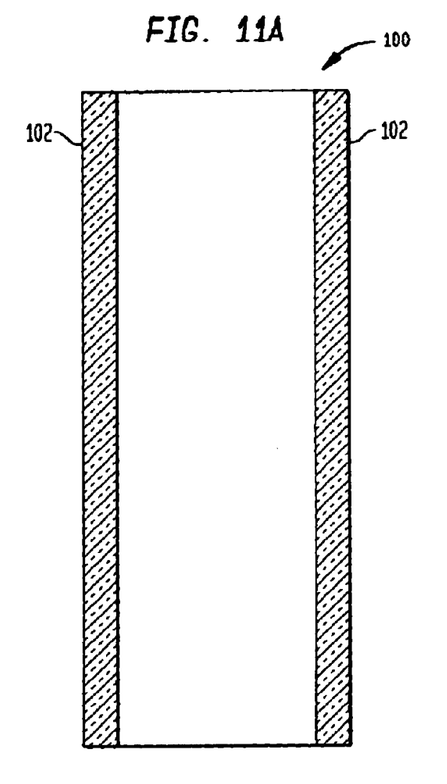
Figure 11B:
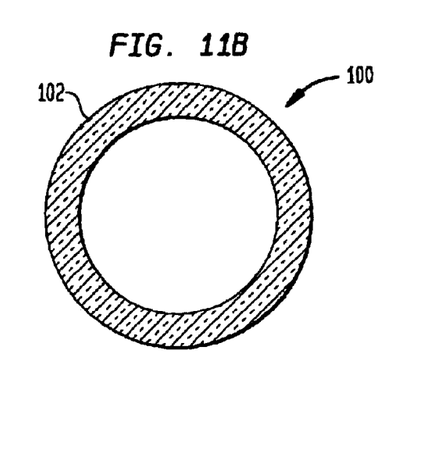

FIGS. 11A–14A show a series of cross section views, and FIGS. 11B–14B show a series of end views, illustrating the construction of a preform 100 using an MCVD technique. These figures are not drawn to scale. As shown in FIGS. 11A and 11B, the MCVD technique starts with a substrate tube 102, typically fabricated from pure silica. Each layer of the preform is created by vaporizing constituent chemicals and depositing these chemical vapors onto the interior surface of the substrate tube 102. Each layer of the preform is built successively inward in concentric rings. The substrate tube 102 eventually becomes the cladding in the finished fiber.

Figure 12A:
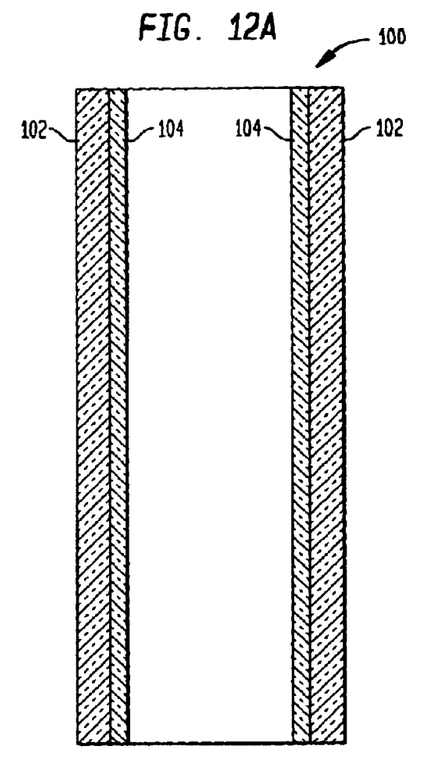
Figure 12B:
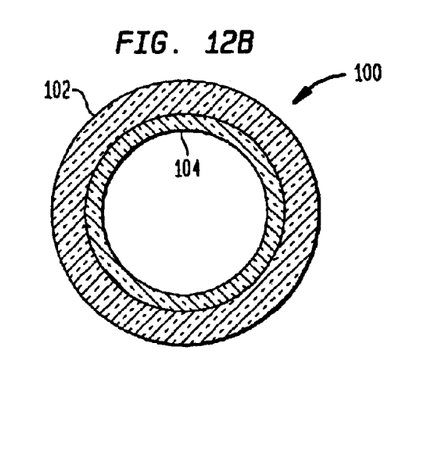
Figure 13A:
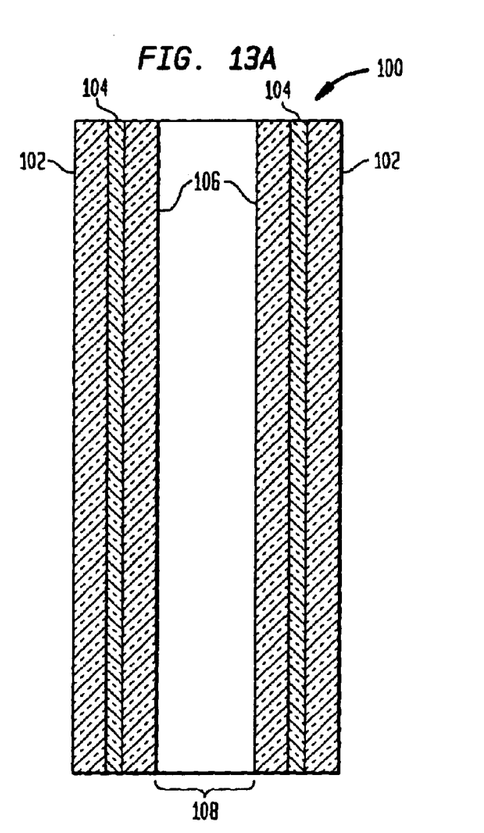
Figure 13B:
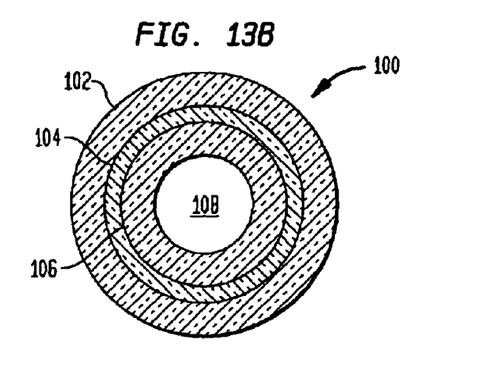

FIGS. 12A and 12B show cross section and side views of a substrate tube 102 after a low-viscosity buffer layer 104 has been deposited onto the inside surface of the substrate tube 104. FIGS. 13A and 13B show cross section and side views of the substrate tube 102 after a core structure 106 has been deposited on the inside surface of the buffer layer 104.

As described above, the core structure 106 may include a number of differently doped layers, which are deposited in successive manufacturing steps. For example, in manufacturing the exemplary fiber shown in FIG. 5, the ring layer, trench layer, and core are deposited successively. The ring can be fabricated, for example, from germania-doped glass, which raises the refractive index to approximately 0.002 to 0.004 above pure silica, corresponding to approximately 1 to 3 mole percent of germania. The ring is typically 1 to 3 microns thick in the finished fiber. The trench can be fabricated, for example, from glass doped with fluorine to lower the refractive index to be about 0.003 to 0.006 below pure silica, corresponding to approximately 0.75 mole percent to 1.5 mole percent fluorine. The trench is typically 1–3 microns thick in the finished fiber. The core can be fabricated, for example, from glass doped with germania ($GeO_2$) to raise the refractive index 0.01 to 0.025 above pure silica, corresponding to approximately 6 to 15 mole percent germania, respectively. The core is typically on the order of 2 to 5 microns in diameter in the finished fiber.

Figure 14A:
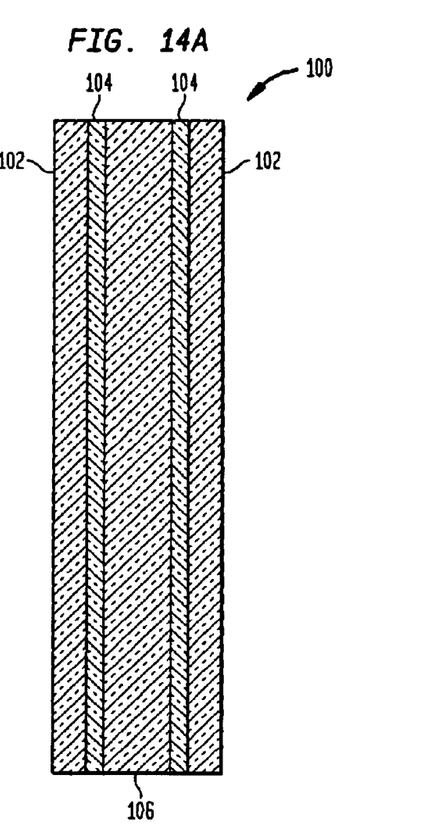
Figure 14B:
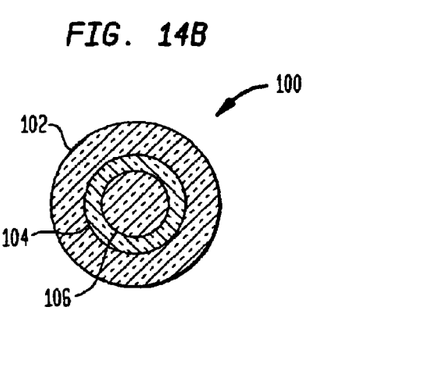

After the deposition of the preform layers has been completed, it will be seen that a central hole 108 still remains. This hole is now closed by controlling the pressure difference between the outside and inside of the preform and by using an appropriate amount of heating. The result, shown in FIGS. 14A and 14B, is a solid rod of glass, displaying the desired refractive index profile.

Figure 15:
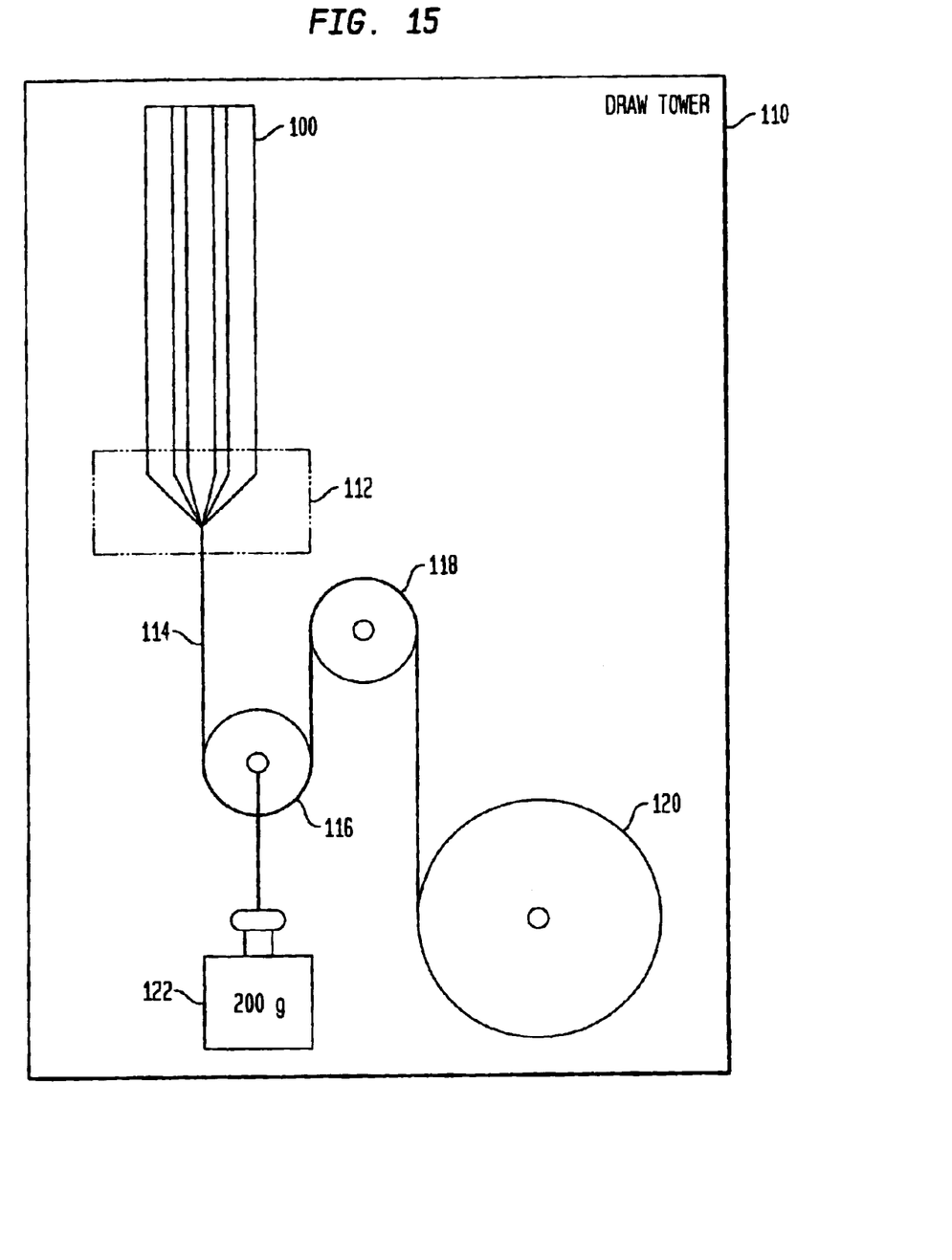
FIG. 15 shows a diagram illustrating the process of drawing an optical fiber from the preform shown in FIGS. 11A–14A and FIGS. 11B–14B.

FIG. 15 shows a diagram of the draw process. The preform 100 is loaded into a draw tower 110. The lower end of the preform is heated in a hot zone 112 until a "gob" of molten material drops off from the preform, drawing a molten fiber 114 behind it. The model fiber 114 cools and hardens almost instantaneously. As shown in FIG. 15, the end of the fiber may be threaded through a system of pulleys 116 and 118 and loaded onto a bulk storage reel 120. As further shown in FIG. 15, a tension 122 may be applied to the fiber as it is drawn. The tension 122 is represented in FIG. 13 by a weight 122 attached to a pulley 116. However, other ways of controlling the tension may be used, for example: by the mutual control of the draw furnace temperature, the rate at which the preform is fed into the furnace and the draw speed. During draw, a coating may be applied to the outside of the fiber 114.

Other techniques may be used to introduce a buffer layer into an optical fiber design. In addition to techniques described above, a hybrid process may be used. For example, low viscosity glass can be deposited onto the inside of a high-viscosity substrate tube using an MCVD technique. This tube can then be collapsed onto a core structure preform that has been fabricated using a VAD or OVD technique. It would also be possible to fabricate a suitable preform using a plurality of suitably doped glass tubes that fit together to form concentric layers.

Figure 16:
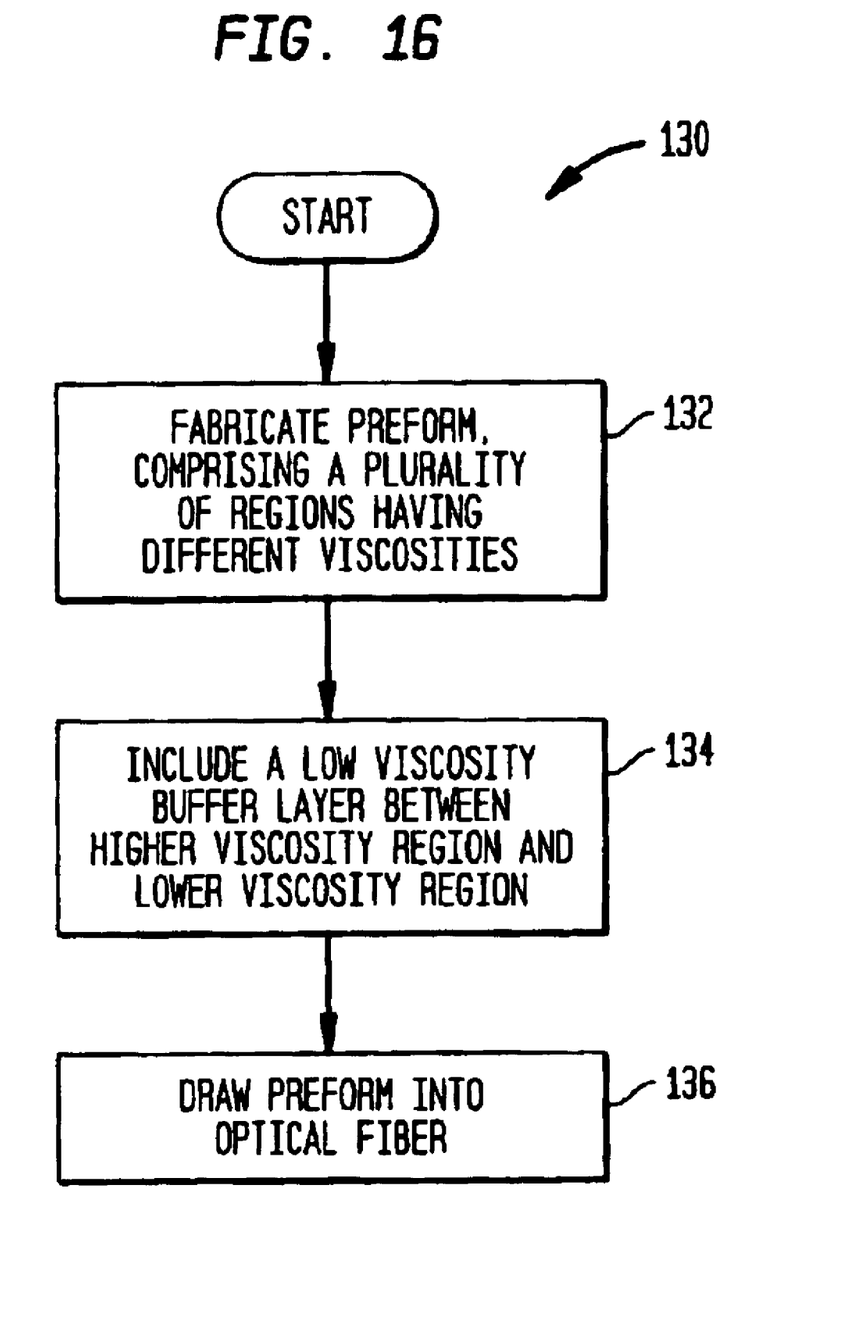
FIG. 16 shows a flowchart of a method according to an aspect of the invention.

FIG. 16 shows a flowchart of a method 130 according to an aspect of the present invention. In step 132, an optical fiber preform is fabricated, comprising a plurality of regions. As used herein, the term "region" generally includes a fiber core or any of the layers surrounding the core. As described above, the preform may be fabricated using any of a variety of techniques. In step 134, which may be performed as part of step 132, a low-viscosity buffer layer is included in the preform, situated between a low-viscosity region and a high-viscosity region of the preform. In step 136, an optical fiber is drawn from the preform.

It should also be noted that the present invention has the added benefit of making optical fibers more manufacturable. By including a low-viscosity buffer layer between the core structure and the pure-silica cladding, the optical performance of the fiber is less sensitive to draw conditions, particularly draw tension, because the fiber is less sensitive to the cladding refractive index changes resulting from frozen-in viscoelastic strains. Fiber properties that are particularly sensitive to draw tension include dispersion and bend loss.

It should further be noted that the use of the low-viscosity concept may be applied in other contexts. For example, it would be possible to design an optical fiber with high-viscosity glass in the fiber core and low-viscosity glass in the outer-core structure and cladding. In this case, the fiber's core index of refraction will be depressed during the draw process while the cladding regions will remain largely unaffected. When the fiber is relaxed by the heat in the vicinity of a splice, the core index will increase and the cladding index will remain largely constant. This change will make the fiber a more strongly guiding fiber in the vicinity of the splice. This can be beneficial when splicing the fiber to another strongly guiding fiber, such as single-mode fiber (SMF). If the transition between the as-drawn and relaxed regions of fiber is sufficiently gradual, the splice loss will be low.

Another alternative to designing an optical fiber to minimize splice loss is to ensure that the viscosity, but not the refractive index, is approximately the same in all regions of the fiber. In that case, all regions of the "viscosity-matched" fiber will experience about the same perturbation to their refractive index so that the index profile relative to the fiber cladding will be the same in both the relaxed and the as-drawn regions of the fiber. An example of this case would be a fiber whose entire cladding region is doped enough so that its viscosity matches that of the core structure.

Figure 17:
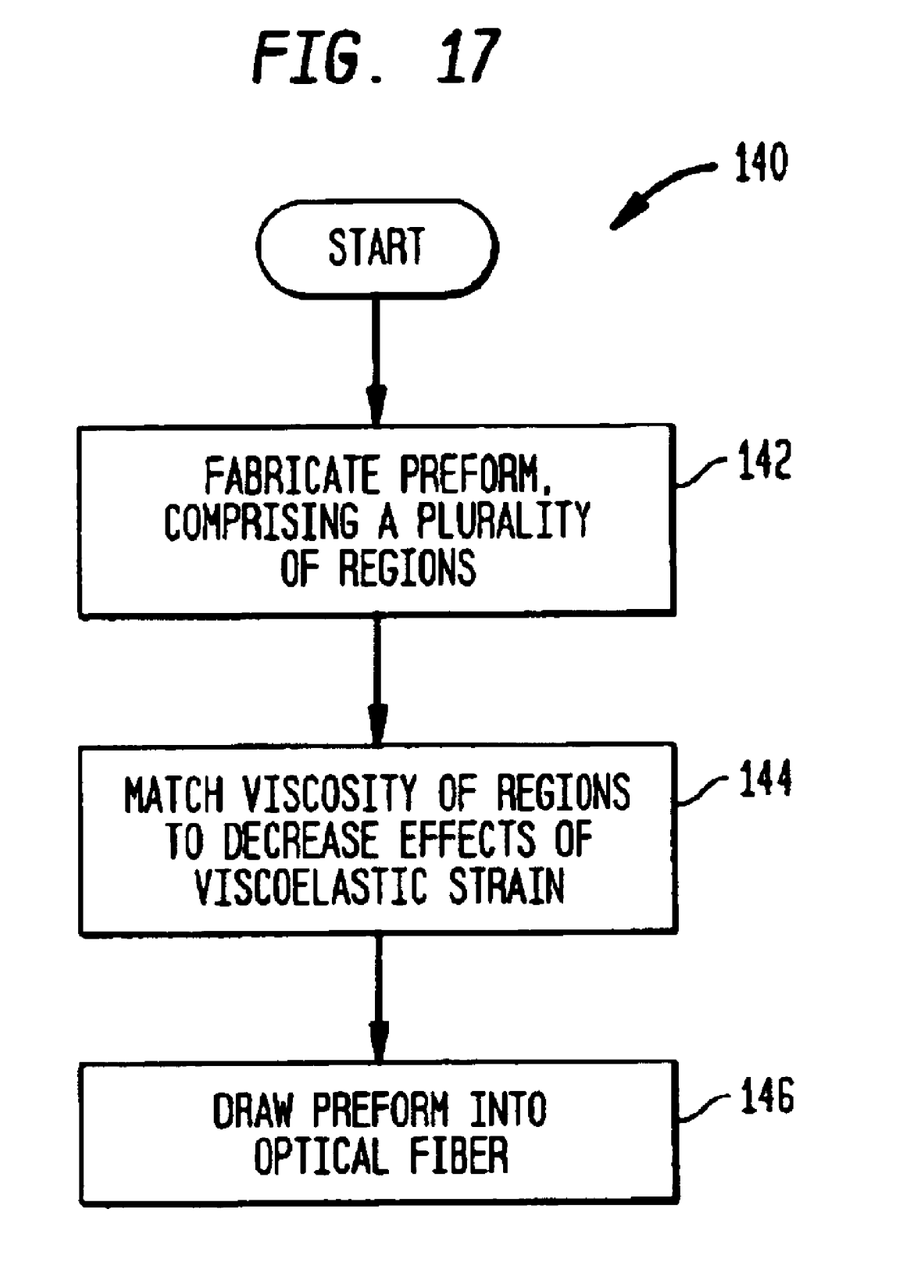
FIG. 17 shows a flowchart of another method according to a further aspect of the invention.

FIG. 17 shows a flowchart of a method 140 according to this further aspect of the invention. In step 142, a preform is fabricated, having a plurality of regions. In step 144, which may be performed as part of step 142, the viscosity of the regions are matched by manipulating the dopant concentrations of the regions so that they have matching viscosities, while continuing to display the desired refractive index profile. The viscosities of the regions need not be identical. However, they are sufficiently close to each other to prevent any one region from bearing the brunt of draw tension. In this way, any viscoelastic strain that is frozen into the drawn fiber will be more evenly distributed across the fiber, rather than being concentrated in a higher viscosity region. In step 146, the preform is drawn into optical fiber.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. An optical fiber, comprising:

at least two regions, one region having a higher viscosity and the other region having a lower viscosity, such that when the fiber is drawn under tension, a strain is frozen into the higher viscosity region; and a lower viscosity buffer layer sandwiched between the higher viscosity region and the lower viscosity region, the buffer layer isolating the lower viscosity region from changes in refractive index in the higher viscosity region arising from a change in the strain frozen into the higher viscosity region.

2. The optical fiber of claim 1, wherein the lower viscosity region comprises a core structure, and wherein the higher viscosity region comprises a cladding.

3. The optical fiber of claim 2, wherein the core structure includes a core and at least one layer surrounding the core.

4. The optical fiber of claim 3, wherein the core structure includes a core, a trench layer surrounding the core, and a ring layer surrounding the trench layer.

5. The optical fiber of claim 1, wherein the buffer layer has a refractive index that matches the refractive index of the cladding in the optical fiber after it is drawn from a preform.

6. An optical fiber preform, comprising:

at least two regions, one region having a higher viscosity and the other region having a lower viscosity, such that when the fiber is drawn under tension from the preform, a strain is frozen into the higher viscosity region; and a lower viscosity buffer layer sandwiched between the higher viscosity region and the lower viscosity region, the buffer layer isolating the lower viscosity region from changes in refractive index in the higher viscosity region arising from a change in the strain frozen into the higher viscosity region.

7. The optical fiber preform of claim 6, wherein the lower viscosity region comprises a core structure, and wherein the higher viscosity region comprises a cladding.

8. The optical fiber of claim 7, wherein the core structure includes a core and at least one layer surrounding the core.

9. The optical fiber of claim 8, wherein the core structure includes a core, a trench layer surrounding the core, and a ring layer surrounding the trench layer.

10. The optical fiber of claim 6, wherein the buffer layer has a refractive index that matches the refractive index of the cladding in the optical fiber after it is drawn from a preform.

11. A method for fabricating an optical fiber, comprising:

(a) fabricating a preform, comprising at least two regions, one region having a higher viscosity and the other region having a lower viscosity, such that when an optical fiber is drawn under tension from the preform, a strain is frozen into the higher viscosity region;

(b) sandwiching a lower viscosity buffer layer between the higher viscosity region and the lower viscosity region, such that the lower viscosity region is isolated from changes in refractive index in the higher viscosity region arising from a change in the strain frozen into the higher viscosity region; and (c) drawing the preform into an optical fiber.

12. The method of claim 11, wherein in step (a) the lower viscosity region comprises a core structure, and wherein the higher viscosity region comprises a cladding.

13. The method of claim 12, wherein in step (a) the core structure includes a core and at least one layer surrounding the core.

14. The method of claim 13, wherein in step (a) the core structure includes a core, a trench layer surrounding the core, and a ring layer surrounding the trench layer.

15. The method of claim 11, wherein the buffer layer has a refractive index that matches the refractive index of the cladding in the optical fiber after it is drawn from a preform.

16. A method for fabricating an optical fiber preform, comprising:

(a) fabricating at least two regions, one region having a higher viscosity and the other region having a lower viscosity, such that when the fiber is drawn under tension from the preform, a strain is frozen into the higher viscosity region; and (b) sandwiching a lower viscosity buffer layer between the higher viscosity region and the lower viscosity region, the buffer layer isolating the lower viscosity region from changes in refractive index in the higher viscosity region arising from a change in the strain frozen into the higher viscosity region.

17. The method of claim 16, wherein in step (a) the lower viscosity region comprises a core structure, and wherein the higher viscosity region comprises a cladding.

18. The method of claim 17, wherein in step (a) the core structure includes a core and at least one layer surrounding the core.

19. The method of claim 18, wherein in step (a) the core structure includes a core, a trench layer surrounding the core, and a ring layer surrounding the trench layer.

20. The method of claim 16, wherein in step (a) the buffer layer has a refractive index that matches the refractive index of the cladding in the optical fiber after it is drawn from a preform.

* * * * *